March 23, 1954

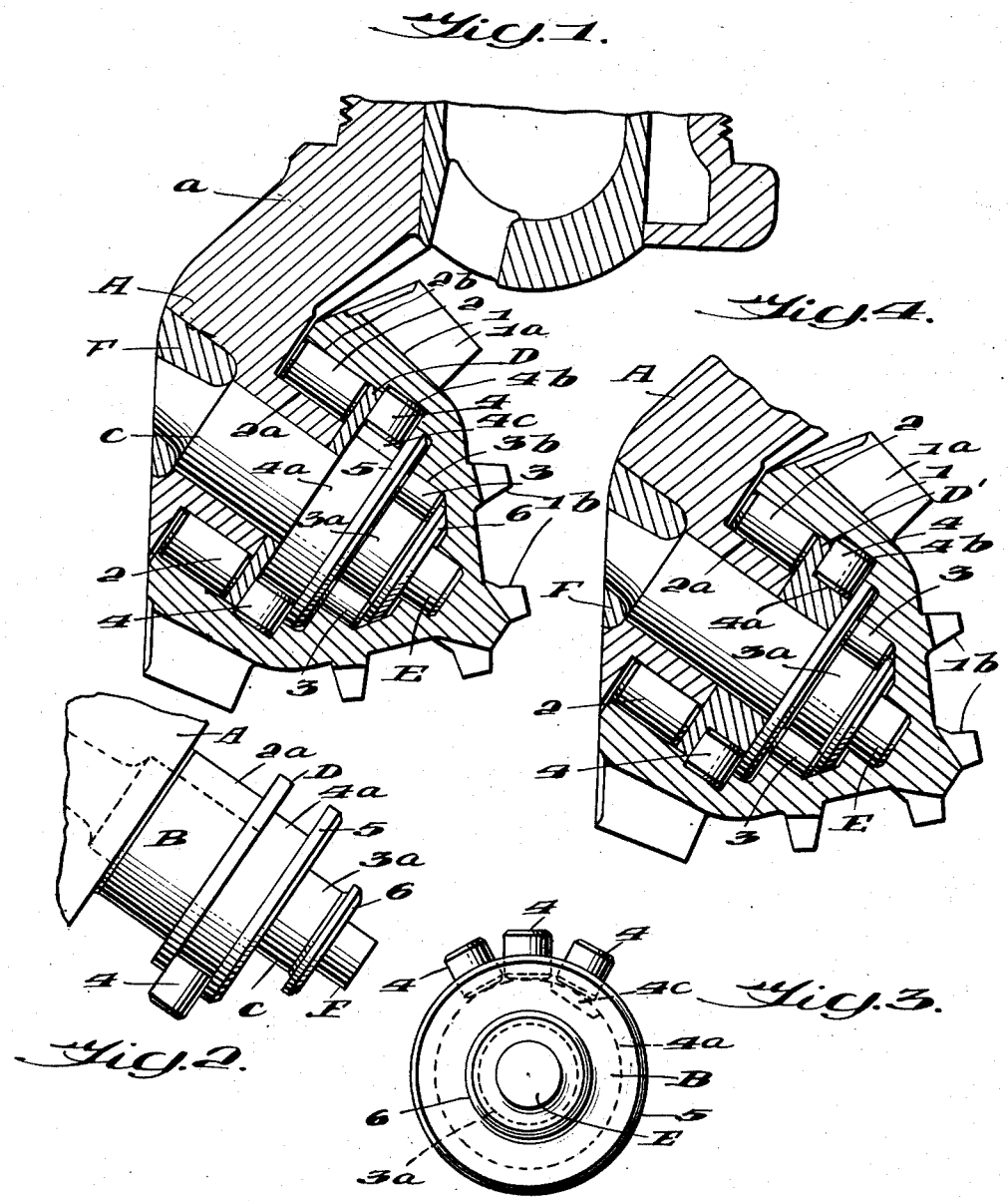

C. E. REED 2,673,128

EARTH-BORING DRILL

Filed Oct. 8, 1949

INVENTOR.
Clarence E. Reed,
BY
Hall & Houghton
ATTORNEYS

Patented Mar. 23, 1954

2,673,128

UNITED STATES PATENT OFFICE 2,673,128

EARTH-BORING DRILL

Clarence E. Reed, Wichita, Kans.

Application October 8, 1949, Serial No. 120,372

4 Claims. (Cl. 308—8.2)

The invention herein disclosed is an improvement upon the general type of earth-boring bits employing antifriction roller bearings.

The invention consists in the features and combinations and arrangements of parts hereinafter described and particularly pointed out in the appended claims.

In the accompanying drawings, in which like reference numerals refer to similar parts:

Fig. 1 is a central vertical sectional view of the roller cutter, with the spindle support and roller bearing organization shown partly in side elevation.

Fig. 2 is a detail of the spindle and a roller thrust and hold-on bearing element.

Fig. 3 is an end view of the structure of Fig. 2 showing three of the roller thrust and hold-on bearings in place.

Fig. 4 is a partial sectional view similar to Fig. 1, showing a modified arrangement.

Figure 5:
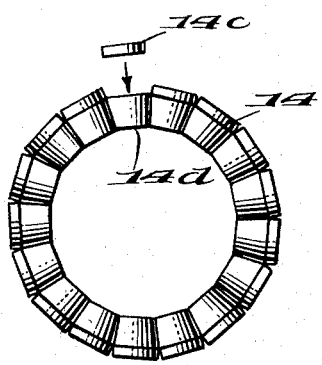
Fig. 5 is an end view of a set of compound cylindrical and frusto-conical bearings.

Referring to the drawings, in each of the forms shown, the toothed roller cutter 1 is of frusto-conical form, but the invention is not limited to this form of cutter. In the forms shown, each cutter 1 has a wide base cutting zone 1a which is inclined to a frusto-conical toothed cutting zone 1b on said cutter, and which dominates the rolling motion of the cutter, the teeth on the frusto-conical cutting zone 1b being arranged in widely spaced-apart circumferential rows. As best shown in Fig. 2 the spindle B has a base or body portion A from which extends a shank a for attachment in any suitable manner to a bit head or other support. In practice, a plurality of spindles are attached to a common drill head, and may operate at different radial distances from the axis of the drill head.

In each of the forms shown, the roller cutter 1 encloses the free end of the spindle and is rotatably supported on the spindle primarily by anti-friction bearings 2 and 3 shown as longitudinal axis roller bearings. In each form shown the cutter 1 is further supported against endwise motion relative to the spindle by radial axis thrust and hold-on roller bearings, shown as cylindrical rollers 4 in Figs. 1 to 4, as compound cylindrical and frusto-conical rollers 14, in Figs. 5 and 6, and as frusto-conical rollers 24 in Figs. 7 and 8.

To cooperate with the anti-friction bearings 2, 3 and 4, the spindle B is provided with raceways 2a, 3a and 4a, best shown in Fig. 2, and the cutter is provided with complementary raceways 2b, 3b and 4b. Thus, in the preferred forms shown, the set of rollers 4, 14 or 24 comprises rollers having their axes positioned in planes at right-angles to the axes of the rollers of set 2 or 3, and the rollers 4, 14 and 24, when constituting the principal thrust and hold-on bearings as in the forms shown, are preferably arranged between the sets 2 and 3 where a wide raceway radius is available without undue exposure to abrasion.

Referring now to the form shown in Figs. 1 to 3, it will be observed that the sectional spindle there shown comprises three principal parts; namely, the supporting portion B, the end portion C assembled therewith, and shown in elevation in Fig. 1, and a ring portion D secured between the portions B and C. The end portion C in the form shown is also provided with a terminal or pilot bearing portion E.

In the assembly of the form of Figs. 1 to 3, the spindle end portion C is assembled with the cutter, with the bearing elements 3 in place in one of the complementary raceways 3a, 3b. The cylindrical radial-axis roller bearings 4 which hold the cutter on the spindle and resist thrust, are then inserted into the complementary raceways 4a, 4b, clearance for this purpose being afforded by a recess on the raceway 4a which is filled, after insertion of the rollers 4, by a plug member 4c as shown in Figs. 1 and 3. The plate or ring member D having been assembled on the spindle section C, and the rollers 2 having been assembled on the raceway 2b, the spindle portion C is pressed home into the bore in the base of the spindle portion B and the outer end thereof is welded to the support, as at F.

With this arrangement the outer periphery of the ring D constitutes a friction bearing surface juxtaposed to the inner surface of the cutter 1 between the thrust bearings 4 and the roller bearings 2, and the periphery of the spindle flange 5 also affords a similar friction bearing surface between the thrust rollers 4 and the roller bearings 3. The space between the raceways 4a and 4b is made sufficiently greater than the length of the rollers 4 to afford endwise clearance and avoid endwise pinching of these rollers as the bearings 2, 3, 5 and 6 become worn.

The thrusts of the cutter longitudinally of the spindle axis are borne by the rollers 4, outward thrust being transmitted directly through the ring D to the fixed spindle portion A, thereby preventing endwise pinching of the rollers of set 2. Clearance is initially provided between the inwardly facing surfaces or shoulders of the spindle flanges 5 and 6 and the opposed outwardly facing surfaces or shoulders of the cutter wall, and also between the end or shoulder of the pilot bearing E and the bottom wall or shoulder of the cutter recess opposed thereto, and these surfaces, on wear of the rollers 4 and their associated raceways, become end thrust friction bearings further limiting endwise movement of the cutter under the load of operation.

The arrangement of the roller bearings to avoid endwise pinching thereof affords a particularly free-rolling assembly, and the protection of the bearings by the arrangement shown assures to them a life equal to the life of the cutter teeth, and that the teeth will not be worn away by dragging on the bottom of the drill hole due to failure of the cutter to freely roll.

In the modification shown in Fig. 4, the general arrangement is similar to that of Figs. 1 to 3 except that the shouldered raceway portion 4a (formed integral with the spindle portion C in Figs. 1 to 3) is instead formed integral with the ring member as at D'. This eliminates the need for the recess and plug 4c, as the entire raceway bottom and side wall D (Fig. 4) may be assembled with the spindle after the cylindrical roller bearings 4 have been assembled in the cutter raceway 4b.

Figure 6:
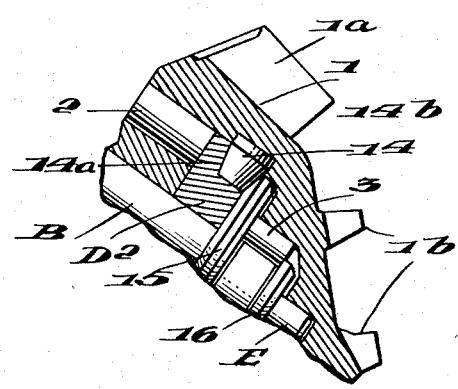
Fig. 6 is a partial sectional view similar to Fig. 1 of an embodiment employing the same.

In the form of Figs. 5 and 6 the arrangement is generally similar to that of Fig. 4, but radial axis rollers 14 of modified forms are employed. In this arrangement the rollers are of compound form, having cylindrical portions engaging in the raceway 14b in the cutter wall, and frusto-conical portions engaging in the beveled spindle raceway 14a between the spindle flange 15 and the ring portion D'. In this form, which is particularly advantageous, assembly may be effected without resort to use of roller admission plugs, by providing clearance as shown between the inwardly facing surfaces of flanges 15 and 16 and the opposed walls of the cutter, and between the end of the pilot bearing E and the bottom of the associated cutter recess, to permit the spindle portion B to be advanced into the cutter sufficiently to allow insertion of the cylindrical ends of the rollers 14 into the raceway 14b. After these rollers and the ring D' have been put in place, the spindle end section B may be drawn outwardly into the position shown in Fig. 6, in which the raceway 14a is closed about the frusto-conical ends of the bearings 14. As is shown in Fig. 5, in this embodiment one of the roller bearing elements 14 is divided at the juncture of its cylindrical and frusto-conical portions into two separate sections 14c and 14d. The section 14c is of slightly less depth than the raceway 14b and may be assembled therein, despite the constriction of the space between the adjacent conical portions of the other bearing elements 14, and the section 14d fits easily into such constricted space thereafter, without requiring the exceeding of normal and desirable working clearances. The compound construction of the bearings 14 has the assembly advantage of not requiring bearing-admitting recesses and plugs therefor, and in addition has other advantages, including the strengthening of the thrust-carrying portions of the ring $D^2$ and flange 15 and the provision of a self-centering tendency even after substantial wear of the bearings and their raceways.

Figure 7:
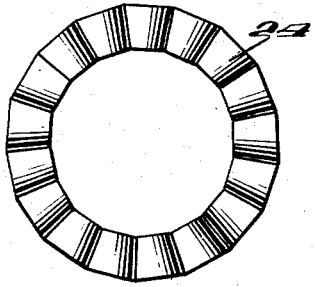
Fig. 7 is an end view of a set of frusto-conical bearings.
Figure 8:
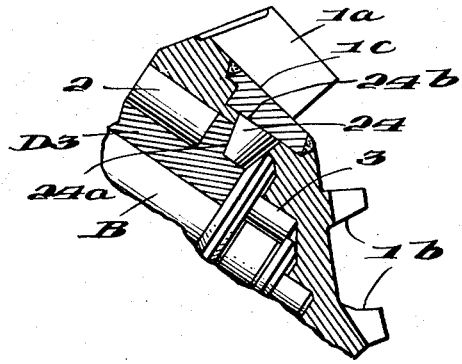
Fig. 8 is a partial sectional view similar to Fig. 1 of an embodiment employing the same.

The embodiment illustrated in Figs. 7 and 8, is generally similar to that in Figs. 5 and 6 but employs wholly frusto-conical thrust and hold-on bearings 24, which dovetail into the cutter raceway 24b. In this form, to enable assembly of the bearings 24 despite their dove-tailed engagement, an insertion opening is provided through the cutter wall which is closed, after insertion of the bearing elements, by a plug 1c, preferably welded in place as shown.

In any of the forms shown, as exemplified at $D^3$ in Fig. 8, the ring member may be made integral with the raceway portion extending under the roller bearings 2. In the form shown in Fig. 1, the raceway portion under roller 4 would be included in the integral arrangement along with the ring.

Mention is made above of the fact that the rollers 4, 14 and 24 between the sets 2 and 3 are preferably arranged on a wide radius. Thus in each of the forms shown, as is best evident from Figs. 1 and 4, the cutter 1 has its frusto-conical body convexed outwardly in the area shown in section, so that its outer part, from above the bearings 4, 14 and 24 to near the spindle support A, is nearly cylindrical or only gradually tapered. This allows the spindle raceway and the cutter raceway for the rollers 4, 14 and 24 to be made of relatively large radius, so that these bearings, in the forms shown, actually work on radii as great as or greater than those of the associated bearings 2.

These provisions are important because the loads imposed on these cutters are substantially parallel to the axis of the drill stem. As the cutter axis is inclined, as shown, the cutter tends to rotate clockwise toward the bit axis as the spindle wears and clearances increase. Under these circumstances, absent the special provisions herein made, the loads would center on the inner ends of the cylindrical rollers in the base of the cutter and tend to roll these cylinders out to a pointed cigar shape. Under such circumstances a relatively fewer hold-on rollers arranged on a relatively small diameter race such as might be accommodated in more nearly conventional cutters would not sufficiently support the load and failure would result.

With the arrangements herein disclosed, an enlarged flange, D or D' in Figs. 1 and 4, is provided between the cylindrical rollers 2 and the hold-on rollers 4 (and their counterparts in the other figures), and the construction of the spindle and cutter is such as to set the hold-on rollers outwardly in a relatively large diameter circle allowing increase in the number of these rollers and in their effectiveness to resist the cutter tilting moments encountered. More particularly, the spindle raceway 2a for rollers 2, by virtue of the flange D or D', comprises a groove in which the rollers 2 are positioned, and the outer ends of the rollers 4, 14 or 24 are located in a cutter raceway 4b which positions their outer ends at a radial distance from the cutter axis greater than the radial distance therefrom to the cutter raceway 2b that contacts the peripheries of the roller bearings 2. Otherwise expressed the working radius or radius to the shear plane of the rollers 4 is at least substantially as great as the radius of the raceway 2b (Fig. 1). As a result the tendency of the stresses to produce undue tilting and roll out the rollers 2 to a cigar shape, and the tendency to twist and jam the hold-on rollers in their raceways, is substantially overcome.

From the foregoing description it will be apparent that the particular forms shown to exemplify the invention are illustrative and not restrictive of the invention, which is defined in the appended claims.

I claim as my invention:

1. A roller boring drill comprising a spindle, a cutter rotatable on said spindle, spaced sets of anti-friction bearings interposed between said cutter and spindle, and a set of radial axis end-thrust roller bearings interposed between said cutter and spindle; said spindle and cutter having opposed grooves therein receiving and constituting raceways for the inner and outer ends of said end thrust roller bearings, respectively; the ends of said radial axis roller bearings received in the spindle groove being shaped as frustums of cones with apices at the axis of the spindle and the groove in the spindle being flared at the same angles as said frusto-conic roller ends; the rollers of said end thrust bearing being so closely assembled in said flaring groove as to have contact with both sides thereof and with each other throughout the peripheral extent of said spindle groove, at least the contiguous portion of the cutter groove adjacent the spindle groove being of substantially the same width as the outer portion of the spindle groove and defining a shear plane therewith; and said end thrust rollers having their portions radially outwardly of said shear plane complementary to said cutter groove.

2. A roller boring drill according to claim 1, in which the cutter groove is parallel walled and in which the portions of the end thrust rollers secured therein are cylindrical.

3. A roller boring drill according to claim 2, in which one of said end thrust rollers is divided into two parts one consisting of its cylindrical portion and the other of its conical portion so that the assembly of the last of the other rollers into the cutter groove may be effected with the cylindrical portion of the divided roller therein, followed by insertion of the conical portion of said divided roller in alignment with its cylindrical portion.

4. A roller boring drill according to claim 3, in which the spindle comprises three parts, the part of the spindle entering most deeply into the cutter carrying one wall of said flaring groove and being securable to a second part of the spindle on the opposite side of said end thrust bearing, and the third part of said spindle consisting of a ring carrying the bottom wall and the other flared wall of said spindle groove, the radial axis rollers when assembled in the cutter groove as aforesaid mutually supporting each other archwise to space their inner end faces radially from the first part of the spindle for facilitating entry of the third part of the spindle therebetween before the first part of the spindle is secured to the second part thereof.

CLARENCE E. REED.

References Cited in the file of this patent

UNITED STATES PATENTS

| Number | Name | Date |
|---|---|---|
| 1,106,065 | Vandergrift | Aug. 4, 1914 |
| 1,228,567 | Killian | June 5, 1917 |
| 1,232,750 | Amess | July 10, 1917 |
| 1,647,853 | Budd et al. | Nov. 1, 1927 |
| 1,760,317 | Pickin | May 27, 1930 |
| 1,957,532 | Flynn | May 8, 1934 |
| 2,004,012 | Reed | June 4, 1935 |
| 2,004,013 | Reed | June 4, 1935 |
| 2,038,387 | Scott | Apr. 21, 1936 |
| 2,060,989 | Harrington | Nov. 17, 1936 |
| 2,065,741 | Reed | Dec. 29, 1936 |
| 2,177,333 | Reed | Oct. 24, 1939 |
| 2,210,077 | Hanly | Aug. 6, 1940 |
| 2,329,751 | Fermier | Sept. 21, 1943 |
| 2,351,357 | Miller et al. | June 13, 1944 |

FOREIGN PATENTS

| Number | Country | Date |
|---|---|---|
| 456,570 | Great Britain | Nov. 11, 1936 |